J. R. NAYLOR.
HARROW ATTACHMENT FOR WHEELED PLOWS.
APPLICATION FILED APR. 14, 1909.
954,758.
Patented Apr. 12, 1910.
2 SHEETS—SHEET 2.
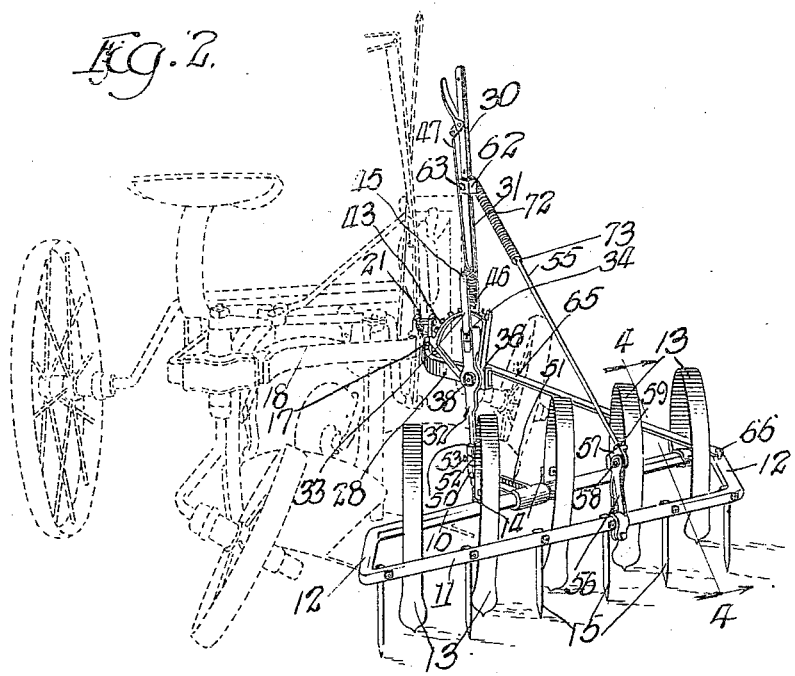
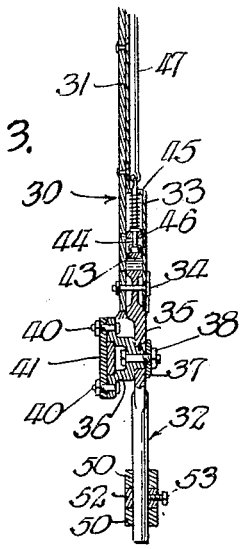
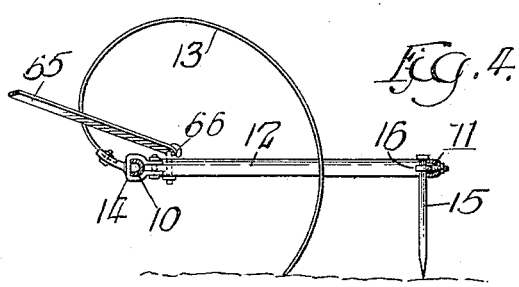
Witnesses:
Inventor
Jonathan R. Naylor
by Poole & Brown
Attys

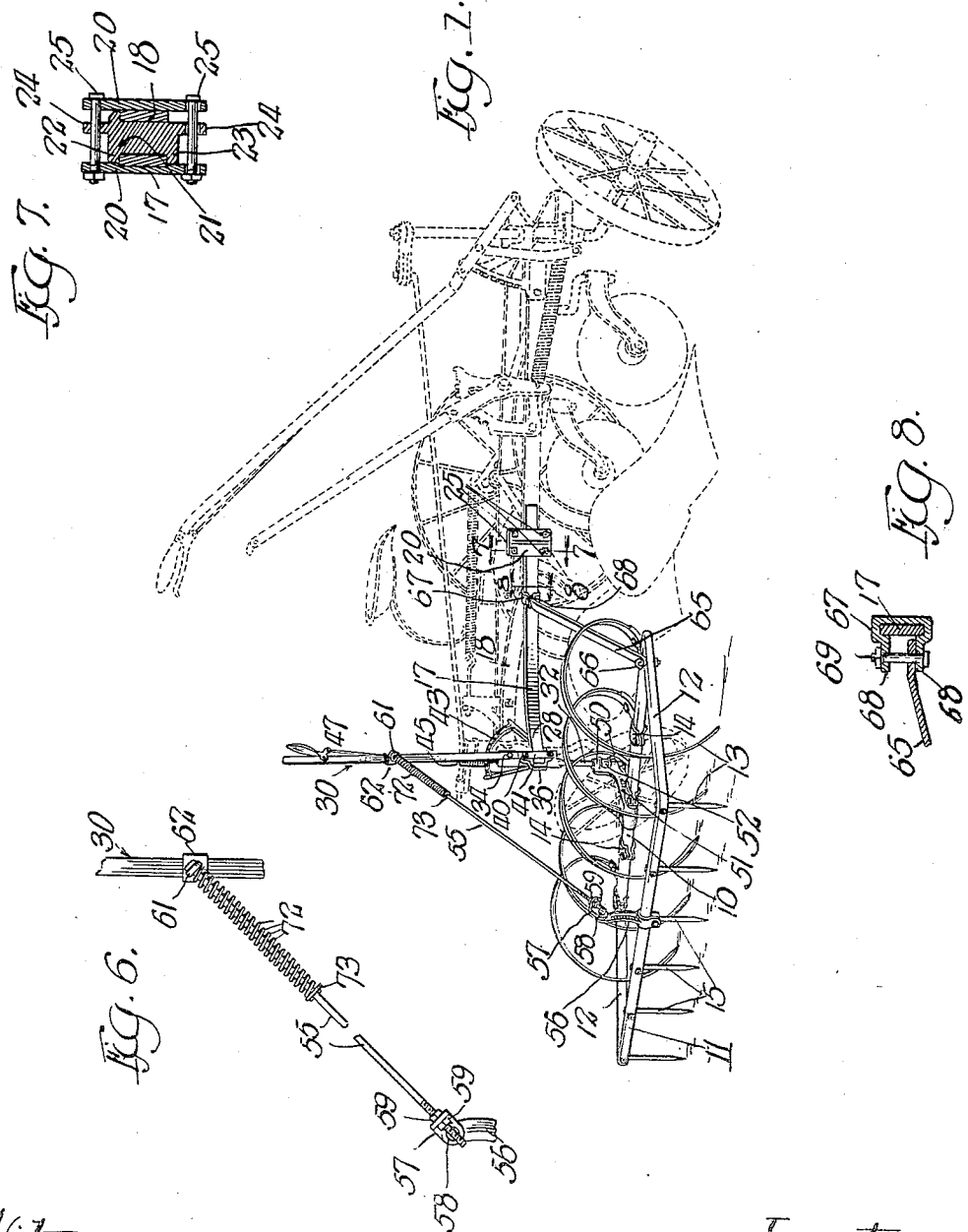

UNITED STATES PATENT OFFICE.

JONATHAN R. NAYLOR, OF LA GRANGE, ILLINOIS, ASSIGNOR TO THE NAYLOR MANUFACTURING COMPANY, A CORPORATION OF ILLINOIS.

HARROW ATTACHMENT FOR WHEELED PLOWS.

954,758.  Specification of Letters Patent.  Patented Apr. 12, 1910.

Application filed April 14, 1909. Serial No. 489,762.

*To all whom it may concern:*

Be it known that I, JONATHAN R. NAYLOR, a citizen of the United States, and a resident of La Grange, in the county of Cook and State of Illinois, have invented certain new and useful Improvements in Harrow Attachments for Wheeled Plows; and I do hereby declare that the following is a full, clear, and exact description thereof, reference being had to the accompanying drawings, and to the numerals of reference marked thereon, which form a part of this specification.

This invention relates to a harrow attachment for wheeled or sulky plows arranged to be attached to and drawn by the plow over the plowed ground behind the plow, whereby the ground may be cultivated as it is turned over by the plow, and the invention consists in the matters hereinafter set forth and more particularly pointed out in the appended claims.

As shown in the drawings:—Figure 1 is a side elevation of a sulky plow showing the harrow connected therewith, the plow being indicated in dotted outline. Fig. 2 is a rear view thereof, showing the lateral relation of the harrow to the plow. Fig. 3 is a longitudinal sectional view of a lever and its mounting for raising the harrow away from the ground. Fig. 4 is a transverse sectional view of the harrow frame on the line 4—4 of Fig. 2. Fig. 5 is a fragmentary view illustrating a bracket constituting part of the harrow frame raising means. Fig. 6 is a detached view illustrating a link or bar which connects the harrow frame with the harrow raising lever. Fig. 7 is a cross-section taken on line 7—7 of Fig. 1. Fig. 8 is a cross-section taken on line 8—8 of Fig. 1.

The plow to which my harrow attachment is connected may be of any suitable or preferred type, adapted for connection with the frame thereof of the harrow attachment. The harrow herein shown is a combined spring tooth and spike tooth harrow although I may use a harrow having either spring or spike teeth alone. The frame is a parallelogram in plan, it comprising front and rear members 10, 11, respectively, and end members 12, 12. As herein shown, the front members of the frame 10 carry the spring teeth 13, 13 which are fixed thereto by suitable clamping fittings 14, and the rear members 11 carry the spike teeth 15 which are fastened to said rear members by means of looped clamping eyes 16. The plow shown is a gang plow, there being two plows arranged side by side and one in advance of the other, in a familiar manner, and the harrow is located at one side of the center of the plow frame so as to be dragged over and cultivate the soil as the furrows are turned over.

The harrow frame is made of a length somewhat greater than the width of the two or more furrows turned over by the plow so that in each traverse of the harrow it overlaps at its outer end the ground that was harrowed in the preceding traverse of the harrow. The said harrow is connected with the plow frame by devices made as follows: 17 designates a draft and supporting beam which is rigidly attached to the frame member 18 of the plow and extends horizontally rearwardly therefrom. The said draft and supporting beam is herein shown as attached to the plow frame by a clamping device shown most clearly in Figs. 1 and 7 and made as follows: The forward end of said draft beam 17 is arranged at the side of and parallel with a portion of the frame member 18. 20, 20 designate two vertical clamping plates located on opposite sides of the plow frame member and draft beam, one of said clamping plates engaging the draft beam and the other the plow frame member. Said plow frame member and draft beam are separated by a spacing block 21 which is provided above and below said parts with flanges 22, 23, respectively, which bear against the upper and lower margins of the draft beam and plow frame member. The said flanges are provided with lugs 24, 24 through which and the upper and lower ends of the clamping plates extend clamping bolts 25, by which the parts between the plates are clamped rigidly together. The rear end of said draft beam is turned laterally toward the plow-land side. On the laterally turned portion 28 of said draft beam is mounted a vertically swinging lever, designated as a whole by 30, which is connected at its lower end with the harrow frame in the manner hereinafter described, whereby the harrow may be raised or lowered to adjust the harrow to the ground, or may be raised entirely away from the ground to be carried by the plow frame when the plow is moved from place to place.

Said lever also constitutes a part of the draft connections between the plow and harrow and the draft beam directly supports the harrow when raised away from the ground. Said lever, as herein shown, comprises an upper member 31, a lower member 32 which is laterally offset from the upper member, and a connecting strap 33 which is riveted to the upper member and is offset between its ends and is connected at its lower end by a bolt 34 to the lower end of the upper member and the upper end of the lower member; said upper end of the lower member fitting between the lower offset part of the strap and the upper member. The lower end of said strap fits in a laterally opening socket at the lateral side of the upper end of the lower member, as clearly shown in Figs. 2 and 3. The lever 30, thus constructed, or constructed in any other suitable manner, is pivoted to a laterally extending stud 35 formed on a bracket 36 that is mounted on the rear, laterally turned end 28 of the draft beam 17, said stud extending through a pivot opening in the lower lever member. The lever is confined on the stud by means of a headed bolt extending through an axial opening in the stud and through a washer 37 which is fitted to the side of the lever, the bolt being held in place by a nut 38. The bracket is clamped to the draft beam by clamping bolts 40 which extend through upper and lower flanges of the bracket, and a clamping plate 41 that is fitted to the side of the beam on its side remote from the bracket. The said bracket is shouldered for engagement with the upper and lower margins of the draft beam to prevent twisting of the bracket thereon, as most clearly shown in Figs. 2 and 3.

Formed integral with the bracket and extending laterally therefrom is a notched segment 43 which is located in the space between the upper member 31 of the lever and the strap 33. The upper convex notched side of the segment is engaged by a reciprocating spring pressed bolt or latch 44 which is guided in openings in the offset part 45 of the strap 33 and a block 46 fixed between the strap and the upper member of said lever. The spring pressed bolt or latch is connected by a link 47 with a latch lever pivoted to the upper end of the lever 30.

The construction described constitutes means whereby the lever 30 may be locked in different positions to adjust the harrow more or less deeply to the soil or to hold the harrow when lifted entirely away from the ground. The means by which the lever is connected with the harrow frame to thus adjust and lift the harrow are made as follows: The lower end of the lower member of the lever extends downwardly through a sleeve 50 formed on the forward end of an arm 51 that is loosely mounted on the front member 10 of the harrow frame. The said lower end of the lever is locked to the arm 51 by means of a collar 52 through which the lever extends, and which collar is located in a notch or recess formed between the ends of the sleeve 50, the collar being fixed to the lever by means of a set screw 53. The connection described affords means for vertically adjusting the harrow with respect to the plow.

Extending downwardly and rearwardly from the upper end of the lever 30 is a lifting rod 55 which is connected at its upper end with the lever and is pivotally connected at its lower end to the upper end of a bracket arm 56 that extends upwardly from and is fixed rigidly to the rear member 11 of the harrow frame. The pivotal connection of said lifting rod 55 with said bracket arm 56 comprises an angle fitting 57, one leg of which is pivoted, as by means of the bolt 58, to the upper end of the bracket arm, and the other leg of which is provided with an aperture through which the lower end of the lifting rod extends. Nuts 59, 59 are screw-threaded on the rod above and below the laterally extending apertured leg of the pivotal fitting and locks the rod to said fitting. The upper and lower nuts screw-threaded to the lifting rod, as described, affords means for vertically adjusting the rear side of the harrow with respect to said lifting rod. The upper end of said lifting rod is headed and extends loosely through an opening in a lateral arm 61 of a collar 62 which surrounds and is fixed to the upper end of the lever 30, as by means of the set screw 63.

65 designates an equalizing draft bar that is connected at its upper end with the draft beam and extends downwardly and laterally and is connected at its lower end with the inner end member 12 of the harrow frame near the forward end thereof. The lower end of the equalizing draft bar 65 is loosely connected with the adjacent end member of the harrow frame through the medium of an eye bolt 66 that is attached to said end member of the harrow frame. The upper end of the bar is connected with the draft beam by means permitting it to slide endwise of the draft beam as is required when the harrow is raised and lowered. The connection between the upper end of the equalizing draft bar and the draft beam is made as follows: Surrounding the draft bar is a clip 67 having lugs 68 through which extends a bolt 69 and by which the clip is confined on the draft beam. The upper end of the equalizing draft bar extends between said lugs 68, 68 and said upper end of the bar is apertured to receive the said bolt 69.

In order that the harrow may rise and fall relatively to the plow frame, due to the passage of the harrow over uneven ground, the lifting rod 55 embraces a yielding or resilient connection such as to permit endwise movement of the lifting rod relatively to the lever 30. This construction and arrangement is effected as follows: 72 designates a spiral spring which surrounds the upper end of the lifting rod 55 and is interposed between a collar 73 fixed to the rod and the laterally extending arm 61 of the attaching collar 62 by which the rod is fixed to the upper end of the lever 30. The said lifting rod 55 is free to slide through the apertured lug 61 of the collar 62, and when the harrow passes over uneven ground tending to lift the rear side thereof, the sliding, spring pressed connection of said lifting rod with the lever permits the harrow to rise and fall to accommodate itself to the uneven ground. Said spring tends to normally hold the harrow in its lowermost position.

The construction described affords a ready and convenient means of attaching a harrow to a plow so that the plowed ground may be cultivated as it is turned over by the plow.

By turning or deflecting the rear end of the draft beam laterally toward the plowed ground, the angle of the harrow to the path of the plow is readily adjusted to secure the most effective action of the harrow upon the plowed ground. Furthermore, by shifting the bracket 36 endwise of the laterally turned portion of the beam the harrow may be adjusted to a limited extent laterally with respect to the plow and thereby enable the harrow to be dragged behind the plow in proper lateral relation to the furrows turned over by the plow.

The harrow frame is arranged at an angle to the path of the plow and is connected with the plow frame in such manner, and at such lateral relation thereto, as to partially or wholly overcome the side draft of the plow, which tendency usually exists in plows of the type herein shown. This arrangement greatly improves the action of the plow and lessens the load on the team.

It will be understood that the invention is susceptible of various adaptations within the spirit and scope of the claims, and the invention is not limited to the details here shown except as hereinafter made the subject of specific claims.

I claim as my invention:—

1. The combination with a wheeled plow, of a draft and supporting beam rigidly attached thereto and extending rearwardly therefrom, a lever pivotally mounted on the rear end of said draft beam and connected with the forward side of the harrow, and a lift rod connected with the upper end of the lever and with the rear side of the harrow frame.

2. The combination with a wheeled plow, of a draft and supporting beam rigidly attached thereto and extending rearwardly therefrom, a lever pivotally mounted on the rear end of said draft beam and connected with the forward side of the harrow, a lift rod connected with the upper end of the lever and with the rear side of the harrow frame, and means for adjusting said lever and lift rod to the harrow frame.

3. The combination with a wheeled plow, of a draft and supporting beam attached thereto and extending rearwardly therefrom, a lever pivotally mounted on said draft beam and connected with the forward side of the harrow frame, a lifting rod connected with the upper end of the lever and with the rear side of the harrow frame, and resilient means permitting the rear side of the harrow frame to rise relatively to said lever.

4. The combination with a wheeled plow, of a draft and supporting beam attached thereto and extending rearwardly therefrom, a lever pivotally mounted on said draft beam and connected with the forward side of the harrow frame, a lifting rod connected with the upper end of the lever and with the rear side of the harrow frame, and an equalizing draft bar connecting the draft beam with one end of the harrow frame.

5. The combination with a wheeled plow, of a harrow in rear thereof, a draft beam attached to the plow frame and extending rearwardly therefrom, a bracket supported on the rear end of the draft beam and adjustable lengthwise thereof, a lever pivoted to the bracket and connected with the harrow frame, and an equalizing draft bar slidingly connected at its forward end with the draft beam and at its rear end with one end of the harrow frame.

6. The combination of a wheeled plow, of a draft and supporting beam attached thereto and extending rearwardly therefrom, a lever pivotally mounted on said draft and supporting beam and connected with the forward side of the harrow, a lifting rod connected at its upper end with the upper end of the lever and at its lower end with the rear side of the harrow frame, and a spring acting on said lifting rod and lever and arranged to permit the harrow to yield upwardly relatively to the plow frame.

7. The combination with a wheeled plow, of a harrow in rear thereof, a draft beam attached to and extending rearwardly from the plow, a lever pivotally mounted on the rear end of the draft beam and connected at its lower end with the front side of the harrow frame, a lifting rod pivotally connected at its lower end with the rear side of the frame and connected at its upper end with said lever, said lifting rod having sliding movement relatively to the lever, and a spring interposed between the lever and a shoulder on the lifting rod.

8. The combination with a wheeled plow, of a harrow in rear thereof, a draft beam attached to the plow frame and extending rearwardly therefrom, a lever pivoted on the draft beam and connected with the forward side of the harrow frame, a lifting rod connecting the upper end of the lever with the rear side of the harrow frame, a notched segment carried by the draft beam, and a spring pressed latch carried by the lever for engagement with the notched segment, the parts being arranged to lift the harrow relatively to the plow frame and to hold the harrow in a lifted position.

In testimony, that I claim the foregoing as my invention I affix my signature in the presence of two witnesses, this 6th day of March A. D. 1909.

JONATHAN R. NAYLOR.

Witnesses:
 W. L. HALL,
 G. R. WILKINS.